United States Patent
Tachibana et al.

(10) Patent No.: US 11,911,854 B2
(45) Date of Patent: Feb. 27, 2024

(54) SOLDER ALLOY, SOLDER PASTE, SOLDER PREFORM AND SOLDER JOINT

(71) Applicant: Senju Metal Industry Co., Ltd., Tokyo (JP)

(72) Inventors: Yoshie Tachibana, Tokyo (JP); Takeshi Sakamoto, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 249 days.

(21) Appl. No.: 17/413,177

(22) PCT Filed: Dec. 14, 2019

(86) PCT No.: PCT/JP2019/049069
§ 371 (c)(1),
(2) Date: Jun. 11, 2021

(87) PCT Pub. No.: WO2020/122253
PCT Pub. Date: Jun. 18, 2020

(65) Prior Publication Data
US 2022/0040801 A1    Feb. 10, 2022

(30) Foreign Application Priority Data

Dec. 14, 2018  (JP) ................... 2018-234634

(51) Int. Cl.
*B23K 35/26* (2006.01)
*C22C 13/02* (2006.01)

(52) U.S. Cl.
CPC ............ *B23K 35/262* (2013.01); *C22C 13/02* (2013.01)

(58) Field of Classification Search
CPC .................................................. B23K 35/262
See application file for complete search history.

(56) References Cited

U.S. PATENT DOCUMENTS

| | | | |
|---|---|---|---|
| 5,900,673 A | 5/1999 | Nishi et al. | |
| 6,319,461 B1 | 11/2001 | Domi et al. | |
| 9,796,053 B2 | 10/2017 | Fujimaki et al. | |
| 2006/0193744 A1* | 8/2006 | Yang ...................... | C22C 13/02 420/561 |

(Continued)

FOREIGN PATENT DOCUMENTS

| CN | 1313802 A | 9/2001 |
|---|---|---|
| JP | 3238051 B2 | 12/2001 |

(Continued)

OTHER PUBLICATIONS

Espacenet Machine Translation JP 2005340268 (Year: 2023).*

(Continued)

*Primary Examiner* — Alexandra M Moore
(74) *Attorney, Agent, or Firm* — The Webb Law Firm

(57) ABSTRACT

Provided is a solder alloy, a solder paste, a solder preform, and a solder joint which suppress chip cracking during cooling, improve the heat dissipation characteristics of the solder joint, and exhibit high joint strength at high temperatures.
The solder alloy has an alloy composition of, by mass: Sb: 9.0 to 33.0%; Ag: more than 4.0% and less than 11.0%; and Cu: more than 2.0% and less than 6.0%, with the balance of Sn.
Moreover, the solder paste, the solder preform, and the solder joint all contain said solder alloy.

8 Claims, 3 Drawing Sheets

(56) References Cited

U.S. PATENT DOCUMENTS

| | | |
|---|---|---|
| 2007/0295528 A1 | 12/2007 | Nishi et al. |
| 2016/0325384 A1 | 11/2016 | Liu et al. |
| 2018/0326542 A1 | 11/2018 | Sakai et al. |

FOREIGN PATENT DOCUMENTS

| | | | | |
|---|---|---|---|---|
| JP | 2003290976 A | | 10/2003 | |
| JP | 2005340268 A | * | 12/2005 | ............. H01L 24/29 |
| JP | 2005340268 A | | 12/2005 | |
| JP | 2006035310 A | | 2/2006 | |
| JP | 2018518368 A | | 7/2018 | |
| JP | 2018187670 A | | 11/2018 | |
| KR | 1020150024441 A | | 3/2015 | |
| WO | 0076717 A1 | | 12/2000 | |

OTHER PUBLICATIONS

Hodulova et al., "Research and development of lead-free solder for microelectronics in consideration of the environmental and qualitative aspects", Weld World, May 15, 2014, 719-727, vol. 58, International Institute of Welding.

McCormack et al., "New Pb-free solder alloy with superior mechanical properties", Applied Physics Letters, Jul. 5, 1993, 15-17, vol. 63, No. 1, Woodbury, NY, US.

* cited by examiner

SOLDER ALLOY, SOLDER PASTE, SOLDER PREFORM AND SOLDER JOINT

CROSS-REFERENCE TO RELATED APPLICATIONS

This application is the United States national phase of International Application No. PCT/JP2019/049069 filed Dec. 14, 2019, and claims priority to Japanese Patent Application No. 2018-234634 filed Dec. 14, 2018, the disclosures of which are hereby incorporated by reference in their entirety.

BACKGROUND

Technical Field

The present invention relates to an Sn—Sb—Ag—Cu-based solder alloy, and a solder paste, a solder preform and a solder joint, each comprising the Sn—Sb—Ag—Cu-based solder alloy.

Background Art

Conventionally, Si is mainly used as a material for semiconductor chips. In recent years, the characteristics required for semiconductors have become more sophisticated and the usage environment has become increasingly harsh, and Si has been replaced by SiC, GaAs, GaN and the like. Each of these semiconductor chips has excellent characteristics as a packaged semiconductor element, and is applied to optical devices such as power transistors and LEDs.

These semiconductor elements can be operated at a high temperature, and the temperature of the solder joint between the semiconductor elements and the substrate or the like may reach about 250 to 280° C. Therefore, a high-temperature solder that does not melt during the operation of the semiconductor element is required. Furthermore, because a semiconductor element generates heat during operation, connecting it to a heat radiating plate such as a metal core or a ceramic plate, is necessary to dissipate heat, and a high-temperature solder is also required for such applications.

Some high-temperature solders have already been known, and examples thereof include Au—20Sn solder alloy, which is an Au—Sn eutectic composition alloy. The Au—20Sn solder alloy can be used at 250° C. or higher and lower than 280° C. as the eutectic temperature is 280° C. However, it is a very expensive material.

Therefore, Sn—Sb-based, Bi-based, and Zn-based solder alloys, and Ag-containing sintered alloys have been studied as examples of lower-cost high-temperature solder alloys. Among them, Sn—Sb-based solder alloys are superior to Bi-based and Zn-based solder alloys and Ag-containing sintered powder sintered solders in terms of thermal conductivity, corrosion resistance, and joint strength.

Here, Patent Document 1 discloses a Sn—Sb—Ag—Cu alloy as a brazing material with a melting point lower than that of a silver-copper alloy, in order to suppress cracks and curvatures of a ceramic substrate that may occur during joining. It describes that the brazing material described in the examples in this Document has a melting temperature of 400° C. or higher and the Sn content is suppressed to 50% by weight or less. Furthermore, in the examples in this Document, an alloy composition containing Sb in an amount of 40% by weight or more and an alloy composition containing Ag in an amount of 70% by weight or more are disclosed.

Patent Document 2 discloses a solder alloy containing Sn and Sb as the main components, 10% by weight or more of Ag, and 10% by mass or more of Cu to have a high melting point and improved Vickers hardness. In the invention described in this Document, the Ag and Cu contents are adjusted as described above so that the melting point falls within the range of 306 to 348° C.

Patent Document 1: Japanese Patent No. 3238051
Patent Document 2: Japanese Unexamined Patent Application Publication No. 2003-290976

SUMMARY

However, the brazing materials and solder alloys described in Patent Documents 1 and 2 have been designed with a focus on the melting point, and contain a high content of Sb, Ag, and Cu, then have hard intermetallic compounds after reflow. During cooling after heating, the molten solder solidifies before the semiconductor chip or substrate is cooled, so that a large stress is applied to the solder joint owing to the difference in the coefficient of linear expansion between the semiconductor chip and the substrate. Here, in recent years, remarkable miniaturization of semiconductor elements has been achieved; as a result, the plate thickness of semiconductor chips tends to be thinner. Because the stress during cooling is concentrated on the semiconductor chip instead of the solder joint, the problem that the semiconductor chip is damaged has come to occur. Patent Document 1 discloses an alloy which has a low melting point of about 400 to 500° C. to prevent cracks from developing in the ceramic substrate; however, the melting point is still high, making the alloy unusable for thin semiconductor chips. Patent Document 2 describes the evaluation of the Vickers hardness as a mechanical property; however, because the Vickers hardness is 10 times or more than that of a conventional alloy, damage to the semiconductor chips is unavoidable.

Furthermore, the Sn—Sb—Ag—Cu alloy described in Patent Documents 1 and 2 has a high melting point. It contains a compound that cannot be completely melted during heating, and the compound grows during cooling after heating when a solder joint is formed. Because these alloys are in a semi-molten state when heated, they have a high viscosity, and voids are not discharged and remain inside the joint when the compound grows during cooling. The voids remaining in the solder joint significantly reduce the heat dissipation characteristics of the solder joint. Because most of the heat generated in the semiconductor element is dissipated through the substrate, it is difficult for the heat to be conducted to the substrate when the above alloy is used, and the performance of the semiconductor element that should be exerted originally cannot be obtained.

Furthermore, Patent Document 1 describes that Sn is suppressed to 50% by weight or less to suppress voids and the like. In the examples of Patent Document 1, in the alloy composition consisting of Sn, Sb, Ag, and Cu, the Sb content is 40% by weight or more, or the Ag content is 50% by weight or more. In the brazing material described in Patent Document 1, Ag and Sb are components for adjusting the melting point, but excessive addition of both elements increases the viscosity of the molten solder as the melting point increases, which lead to the voids remaining in the solder joint and the deterioration of the heat dissipation characteristics of the solder joint. As a result, the performance of the semiconductor element that should be exerted originally cannot be obtained. Patent Document 2 describes the addition of 10% by mass of Ag and 10% by mass or more of Cu. However, in this case as well, as in Patent Document 1, the viscosity of the molten solder increases and voids remain in the solder joint during cooling, which deteriorated the heat dissipation characteristics of the solder joint.

In addition, semiconductor elements that carry a large current may generate heat up to about 220° C., so a solder joint that exhibits high joint strength at 250° C. is required.

Therefore, an objective of the present invention is to provide a solder alloy, a solder paste, a solder preform, and a solder joint, that suppress chip cracking during cooling, improve the heat dissipation characteristics of the solder joint, and exhibit high joint strength at high temperatures.

The present inventors investigated the cause of damage to the semiconductor chip when the contents of Sb, Ag, and Cu were increased to raise the melting point, as in the conventional alloy design. It is thought that, in the conventional alloy design, the contents of Sb, Ag, and Cu are increased to raise the melting point via suppression of the precipitation of the Sn phase, which is a low melting point phase. This conventional alloy design hardens the solder alloy, damaging the semiconductor chip.

The present inventors have diligently studied alloy composition and the alloy structure so that the stress generated during cooling can be relaxed at the solder joint. In recent years, because the durability of semiconductor chips has tended to decrease due to thinning, the present inventors have conceived the idea of intentionally precipitating the Sn phase, which has been avoided in conventional alloy designs. This is because the Sn phase is more flexible than the intermetallic compound and can relax the stress applied during cooling.

Although the Sn phase is precipitated via solidification segregation during cooling, because Sb, Ag, and Cu easily precipitate Sn compounds, the Sn phase does not precipitate when the content of these elements is high. Furthermore, as in the invention described in Patent Document 1, when the Sb and Ag contents are high and the Sn content is low, Sn is consumed for the precipitation of the SnSb and $Ag_3Sn$ compounds, thereby preventing the precipitation of the Sn phase. Regarding the invention described in Patent Document 2, when the Cu content is high, Sn is consumed for the precipitation of the $Cu_6Sn_5$ and $Cu_3Sn$ compounds, minimizing the precipitation of the Sn phase.

As described above, in the Sn—Sb—Ag—Cu based solder alloy, in order for the Sn phase to precipitate to some extent, even if Sn is consumed for the precipitation of the $Ag_3Sn$, $Cu_6Sn_5$, $Cu_3Sn$, and SnSb compounds, it must be present in the solder alloy alone. The present inventors have conceived the idea that damage to the semiconductor chip can be suppressed when the Sn phase is appropriately precipitated.

Meanwhile, when the Sb, Ag, and Cu contents are reduced such that a large amount of the Sn phase is precipitated, the crosslinking between the semiconductor chip and the substrate due to the $Ag_3Sn$, $Cu_6Sn_5$, $Cu_3Sn$, and SnSb compounds does not occur. As a result, the joint strength of the solder joint decreases when the semiconductor element generates heat during driving. However, even if the Sn phase is precipitated, if the semiconductor chip and the substrate are crosslinked by the $Ag_3Sn$, $Cu_6Sn_5$, $Cu_3Sn$, and SnSb compounds, a high joint strength at a high temperature can be obtained. The present inventors have conceived the idea that involves appropriately precipitating the Sn phase so that the semiconductor chip and the substrate are crosslinked by the $Ag_3Sn$, $Cu_6Sn_5$, $Cu_3Sn$, and SnSb compounds, and a high joint strength at a high temperature can be obtained.

In addition to the above-mentioned idea, the present inventors have also have conceived the idea that the alloy can be used as a high-temperature solder when the Sn phase is appropriately precipitated.

Furthermore, the present inventors investigated the cause of voids. Because the conventional alloy has a high melting point, it was considered that the compound remaining undissolved during heating grows during solidification, thereby crosslinking the semiconductor chip and the substrate. Here, if the heating temperature is raised, the semi-molten state transitions to a completely melted state, but the reflow conditions are determined through considering various conditions such as the heat resistance of the substrate and the semiconductor element, and consequently, cannot be easily changed. Therefore, the present inventors have conceived the idea that the molten solder should melt completely under the same heating conditions as before, so that the viscosity of the solder decreases and voids are discharged, and as a result, the semiconductor chip and the substrate are crosslinked owing to the precipitation of the compound during cooling.

As a result of investigating the Sb, Ag, and Cu contents in detail based on this idea, the present inventors found that when each of these contents is within a predetermined range, the solder can be used as a high-temperature solder, chip cracking after reflow is suppressed, the heat dissipation characteristics of solder joints are improved by reducing the amount of voids, and the solder alloy exhibits high-temperature joint strength comparable to conventional ones, allowing the present inventors to complete the present invention.

The present invention obtained from this finding is as follows.

(1) A solder alloy characterized by having an alloy composition consisting of, by mass: Sb: 9.0 to 33.0%; Ag: more than 4.0% and less than 11.0%; and Cu: more than 2.0% and less than 6.0%, with the balance consisting of Sn.

(2) The solder alloy according to (1) above, wherein the alloy composition further contains at least one of, by mass: Al: 0.003 to 0.1%; Fe: 0.01 to 0.2%; and Ti: 0.005 to 0.4%.

(3) The solder alloy according to (1) or (2) above, wherein the alloy composition further contains at least one of P, Ge, and Ga in a total amount of 0.002 to 0.1% by mass.

(4) The solder alloy according to any one of (1) to (3) above, wherein the alloy composition further contains at least one of Ni, Co, and Mn in a total amount of 0.01 to 0.5% by mass.

(5) The solder alloy according to any one of (1) to (4) above, wherein the alloy composition further contains at least one of Au, Ce, In, Mo, Nb, Pd, Pt, V, Ca, Mg, Si, Zn, Bi, and Zr in a total amount of 0.0005 to 1% by mass.

(6) The solder alloy according to any one of (1) to (5) above, wherein the solder alloy has an alloy structure consisting of at least one of an $Ag_3Sn$ compound, a $Cu_3Sn$ compound and a $Cu_6Sn_5$ compound, and an SnSb compound, with the balance consisting of an Sn phase.

(7) The solder alloy according to (6) above, wherein in the alloy structure, an amount of the Sn phase is 5.6 to 70.2 at. % by vol %.

(8) The solder alloy according to (6) or (7) above, wherein in the alloy structure, an amount of the $Ag_3Sn$ compound is 5.8 to 15.4 at. %, an amount of the $Cu_6Sn_5$ compound is 5.6 to 15.3 at. %, an amount of the $Cu_3Sn$ compound is 1.0 to 2.8 at. %, and an amount of the SnSb compound is 16.8 to 62.1 at. %.

(9) The solder alloy according to any one of (1) to (8) above, wherein the alloy composition satisfies the following equations (1) to (3).

$$1.2 < Sn / \left\{ \left( \frac{26.84}{73.16} \right) \times Ag + \left( \frac{60.89}{39.11} \right) \times Cu \times x + \left( \frac{38.37}{61.63} \right) \times Cu \times (1-x) + \left( \frac{49.37}{50.63} \right) \times Sb \right\} \leq 6.50 \quad \text{equation (1)}$$

$$(2/3) \leq x \leq (15.3/16.3) \quad \text{equation (2)}$$

$$78 \leq Ag \times Cu \times Sb \leq 2029 \quad \text{equation (3)}$$

wherein Ag, Cu, and Sb each in the above equations (1) and (3) represents the content (mass %) in said alloy composition.

(10) A solder alloy having Ag, Cu, and Sb, with the balance consisting of Sn, wherein the solder alloy is characterized by having an alloy structure consisting of at least one of an $Ag_3Sn$ compound, a $Cu_3Sn$ compound, and a $Cu_6Sn_5$ compound, and an SnSb compound, with the balance consisting of an Sn phase.

(11) The solder alloy according to (10) above, wherein in the alloy structure, an amount of the Sn phase is 5.6 to 70.2 at. %.

(12) The solder alloy according to (10) or (11) above, wherein in the alloy structure, an amount of the $Ag_3Sn$ compound is 5.8 to 15.4 at. %, an amount of the $Cu_6Sn_5$ compound is 5.6 to 15.3 at. %, an amount of the $Cu_3Sn$ compound is 1.0 to 2.8 at. %, and an amount of the SnSb compound is 16.8 to 62.1 at. %.

(13) A solder paste comprising the solder alloy according to any one of (1) to (12) above.

(14) A solder preform comprising the solder alloy according to any one of (1) to (12) above.

(15) A solder joint comprising the solder alloy according to any one of (1) to (12) above.

BRIEF DESCRIPTION OF THE DRAWINGS

FIG. 1A shows an SEM image of Comparative Example 2.

FIG. 1B shows a cross-sectional EDS element mapping diagram of Comparative Example 2.

FIG. 1C shows an SEM image of Example 6 of the present invention.

FIG. 1D shows a cross-sectional EDS element mapping diagram of Example 6 of the present invention.

FIG. 2A shows an optical micrograph of Example 6 of the present invention.

FIG. 2B shows an X-ray plan image of Example 6 of the present invention.

FIG. 2C shows an optical micrograph of Example 10 of the present invention.

FIG. 2D shows an X-ray plan image of Example 10 of the present invention.

FIG. 2E shows an optical micrograph of Comparative Example 7.

FIG. 2F shows an X-ray plan image of Comparative Example 7.

DETAILED DESCRIPTION

Figure 1:
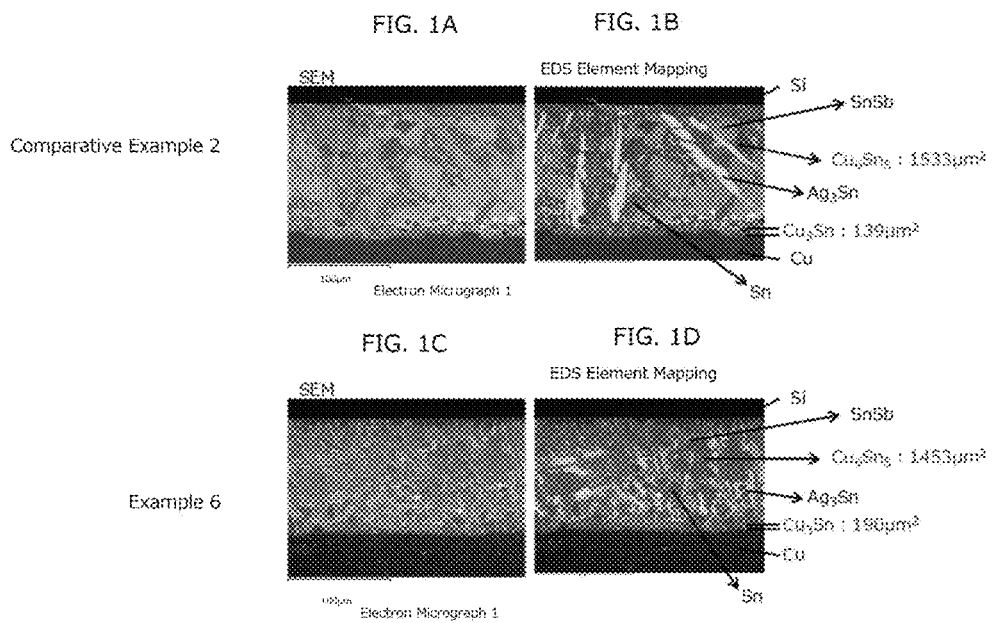
FIG. 1 shows a cross-sectional SEM image and a cross-sectional EDS element mapping diagram of a solder joint.

The present invention is described in more detail below. In the present description, "%" relating to the solder alloy composition refers to "mass %" unless otherwise specified.

1. Solder Alloy (1) Sb: 9.0 to 33.0%

Sb can improve the joint strength at high temperatures by precipitating the SnSb compound and crosslinking the semiconductor chip and the substrate. Furthermore, if the Sb content is within the above range, the amount of precipitated Sn phase can be controlled, and a high chip cracking resistance is maintained. In addition, Sb can improve the heat dissipation characteristics of the solder joint by optimizing the viscosity of the molten solder and suppressing the generation of voids.

If the Sb content is less than 9.0%, the amount of precipitated SnSb compound is small and the joint strength at a high temperature cannot be improved. Furthermore, because the amount of remaining Sn is relatively large, the elution of the back metal on the semiconductor chip side is accelerated and the back metal disappears, which may cause the semiconductor chip to peel off. In terms of the lower limit, the Sb content is 9.0% or more, preferably 15.0% or more, more preferably 19.5% or more, and even more preferably 20.0% or more.

On the other hand, if the Sb content exceeds 33.0%, a large amount of the SnSb compound is precipitated; thus, the Sn phase is not sufficiently precipitated, and the stress relaxing effect is lowered, which may cause chip cracking. In terms of the upper limit, the Sb content is 33.0% or less, preferably 30.0% or less, more preferably 27.5% or less, and even more preferably 27.0% or less.

(2) Ag: More than 4.0% and Less than 11.0%

Ag can improve the joint strength at high temperatures by precipitating the $Ag_3Sn$ compound and crosslinking the semiconductor chip and substrate. Furthermore, if the content of Ag is within the above range, the amount of precipitated Sn phase can be controlled, and a high chip cracking resistance is maintained.

If the Ag content is 4.0% or less, the amount of the precipitated $Ag_3Sn$ compound is small and the joint strength at a high temperature cannot be improved. Furthermore, because the amount of remaining Sn is relatively large, the elution of the back metal on the semiconductor chip side is accelerated and the back metal disappears, which may cause the semiconductor chip to peel off. In terms of the lower limit, the Ag content is more than 4.0%, preferably 4.1% or more, and more preferably 7.0% or more.

On the other hand, if the Ag content is 11.0% or more, a large amount of the $Ag_3Sn$ compound is precipitated, preventing the Sn phase from precipitating, and the stress relaxing effect is lowered, which may cause chip cracking. In terms of the upper limit, the Ag content is less than 11.0%, preferably 10.9% or less, and more preferably 10.0% or less.

(3) Cu: More than 2.0% and Less than 6.0%

Cu can improve the joint strength at high temperatures by precipitating the $Cu_6Sn_5$ and $Cu_3Sn$ compounds and crosslinking the semiconductor chip and the substrate. Furthermore, if the Cu content is within the above range, the amount of precipitated Sn phase can be controlled, and a high chip cracking resistance is maintained. In addition, Cu can suppress the diffusion of Cu on the lead frame side.

If the Cu content is 2.0% or less, the $Cu_6Sn_5$ and $Cu_3Sn$ compounds are not sufficiently precipitated, and the joint strength at a high temperature cannot be improved. Furthermore, because the amount of remaining Sn is relatively large, the elution of the back metal on the semiconductor chip side is accelerated and the back metal disappears, which may cause the semiconductor chip to peel off. In terms of the lower limit, the Cu content is more than 2.0%, preferably 2.1% or more, and more preferably 3.0% or more.

On the other hand, when the Cu content is 6.0% or more, a large amount of the $Cu_6Sn_5$ and $Cu_3Sn$ compounds are precipitated, which promotes Sn consumption and reduces the stress relaxing effect during solidification shrinkage after reflow, which may cause chip cracking. Furthermore, when a large amount of Sn is consumed to form the above-mentioned compounds, the melting point of the solder alloy does not decrease, and the molten solder does not completely melt during reflow. Thus, the viscosity of the molten solder is not expected to decrease, making it difficult to discharge voids. In terms of the upper limit, the Cu content is less than 6.0%, preferably 5.9% or less, and more preferably 4.0% or less.

(4) At Least One of Al: 0.003 to 0.1%, Fe: 0.01 to 0.2%, and Ti: 0.005 to 0.4%.

These elements are optional elements that can improve the joint strength at high temperatures by suppressing the coarsening of the SnSb, $Cu_6Sn_5$, $Cu_3Sn$, and $Ag_3Sn$ compounds (hereinafter, appropriately referred to as "Sn compounds").

These elements are preferentially precipitated during solidification to become seeds for non-uniform nucleation, preventing the coarsening of each phase. When the nucleation of each phase is promoted by non-uniform nucleation, the starting point of nucleation increases; thus, the area of the crystal grain boundaries in the solder alloy increases and the stress applied to the grain boundaries is dispersed. Therefore, the coarsening of the Sn compounds can be suppressed.

Furthermore, the contents of Al, Ti, and Fe are 0.003 to 0.7% to account for the minimum content of Al and the maximum content of all three types, which is a very small amount. Therefore, even if a compound having a melting point higher than that of the Sn compounds is precipitated as a metal compound containing Al, Ti, Fe and Sb, Ag, Cu, the amount of precipitate is small, and the consumption of Sb, Ag, and Cu in the solder alloy is small. Therefore, because a sufficient amount of precipitated Sn compound to crosslink the semiconductor chip and the substrate is secured, a high joint strength at a high temperature is maintained. In addition, the content of these elements is at most 0.7%, which does not affect the void suppression effect of the present invention and can exhibit high heat dissipation characteristics.

The Al content is preferably 0.003 to 0.1%, more preferably 0.01 to 0.08%, and even more preferably 0.02 to 0.05% in order to fully exhibit the above-mentioned effects. The Fe content is preferably 0.01 to 0.2%, more preferably 0.02 to 0.15%, and even more preferably 0.02 to 0.1%. The Ti content is preferably 0.005 to 0.4%, more preferably 0.01 to 0.3%, and even more preferably 0.02 to 0.2%.

(5) At Least One of P, Ge and Ga in a Total Amount of 0.002 to 0.1%

These are optional elements that reduce the surface tension of the molten solder to suppress oxidation, which is effective in discharging voids. The total content of these elements is preferably 0.002 to 0.1%, more preferably 0.003 to 0.01%. The content of each element is not particularly limited, but P content is preferably 0.002 to 0.005%, Ge content is preferably 0.002 to 0.006%, and Ga content is preferably 0.002 to 0.02% in order to fully exhibit the above-mentioned effects.

(6) Total of at Least One of Ni, Co, and Mn: 0.01 to 0.5%

These elements are optional elements that can make the structure of the solder alloy finer and improve the joint strength at high temperatures. The total content of these elements is preferably 0.01 to 0.5%, more preferably 0.01 to 0.05%. The content of each element is not particularly limited, but Ni content is preferably 0.02 to 0.07%, Co content is preferably 0.02 to 0.04%, and Mn content is preferably 0.02 to 0.05% in order to fully exhibit the above-mentioned effects.

(7) At Least One of Au, Ce, In, Mo, Nb, Pd, Pt, V, Ca, Mg, Si, Zn, Bi, and Zr in a Total Amount of 0.0005 to 1%

These elements are optional elements that may be contained within a range that does not impair the effects of the present invention. The total content of Au, Ce, In, Mo, Nb, Pd, Pt, V, Ca, Mg, Si, Zn, Bi, and Zr is preferably 0.0005 to 1%, more preferably 0.02 to 0.03%.

If Au is contained, its content is preferably 0.0005 to 0.02%. If Ce is contained, its content is preferably 0.0005 to 0.049%. If In is contained, its content is preferably 0.0005 to 0.9%. If Mo is contained, its content is preferably 0.0005 to 0.0025%. If Nb is contained, its content is preferably 0.0005 to 0.003%. If Pd is contained, its content is preferably 0.0005 to 0.03%. If Pt is contained, its content is preferably 0.0005 to 0.012%. If V is contained, its content is preferably 0.0005 to 0.012%. If Ca is contained, its content is preferably 0.0005 to 0.1%. If Mg is contained, its content is preferably 0.0005 to 0.0045%. If Si is contained, its content is preferably 0.0005 to 0.1%. If Zn is contained, its content is preferably 0.01 to 0.2%. If Bi is contained, its content is preferably 0.02 to 0.3%. If Zr is contained, its content is 0.0005 to 0.0008%.

(8) Alloy Structure

The solder alloy according to the present invention preferably has an alloy structure consisting of the $Ag_3Sn$, $Cu_3Sn$, $Cu_6Sn_5$, and SnSb compounds, with the balance consisting of the Sn phase.

The solder alloy according to the present invention crosslinks the semiconductor chip and the substrate through the compounds of Sn with Sb, Ag, and Cu, by containing a predetermined amount of Sb, Ag, and Cu. In other words, the solder joint formed of the solder alloy according to the present invention joins the semiconductor chip and the substrate via the above-mentioned Sn compounds, which have high melting points. Therefore, even if the semiconductor chip generates heat and the temperature of the solder alloy increases, the joint strength at high temperatures can be maintained, and the solder alloy can be used as a high-temperature solder.

Furthermore, the solder alloy according to the present invention can precipitate an appropriate amount of Sn phase by containing a predetermined amount of Sb, Ag, and Cu. When an appropriate amount of Sn phase is precipitated in the Sn compound, the Sn phase, which is softer than the Sn compounds, exhibits a stress relaxing action, and the stress applied to the semiconductor chip during cooling can be relaxed. Furthermore, as the melting point of the solder alloy is lowered, the molten solder is completely melted during reflow, and voids are discharged from the molten solder to improve the heat dissipation characteristics.

To exert such an effect, the solder alloy according to the present invention, preferably has an alloy structure consisting of the SnSb compound formed by precipitation of Sn with Sb, the $Ag_3Sn$ compound formed by precipitation of Sn with Ag, the $Cu_6Sn_5$ compound and the $Cu_3Sn$ compound, each formed by precipitation of Sn with Cu, with the balance consisting of the Sn phase. These compounds have a high melting point and crosslink the semiconductor chip and substrate. Therefore, even when the balance consists of the Sn phase, it functions sufficiently as a high temperature solder. To obtain such an alloy structure, it is preferable to have the above-mentioned alloy composition.

From this point of view, the amount of the precipitated $Ag_3Sn$ compound is preferably 5.8 to 15.4 at. %, the amount of the precipitated $Cu_6Sn_5$ compound is preferably 5.6 to 15.3 at. %, the amount of the precipitated $Cu_3Sn$ compound is preferably 1.0 to 2.8 at. %, the amount of the precipitated SnSb compound is preferably 16.8 to 62.1 at. %, and the amount of the precipitated Sn phase is preferably 5.6 to 70.2 at. %.

In the solder alloy according to the present invention, in terms of the lower limit, the amount of the precipitated $Ag_3Sn$ compound is more preferably 5.9 at. % or more, even more preferably 13.9 at. % or more. In terms of the upper limit, the amount of the precipitated $Ag_3Sn$ compound is more preferably 15.2 at. % or less, even more preferably 14.3 at. % or less, particularly preferably 14.2 at. % or less, most preferably 14.1 at. % or less.

In the solder alloy according to the present invention, in terms of the lower limit, the amount of the precipitated $Cu_6Sn_5$ compound is more preferably 8.0 at. % or more, even more preferably 10.5 at. % or more. In terms of the upper limit, the amount of the precipitated $Cu_6Sn_5$ compound is more preferably 12.5 at. % or less, even more preferably 10.6 at. % or less.

In the solder alloy according to the present invention, in terms of the lower limit, the amount of the precipitated $Cu_3Sn$ compound is more preferably 1.5 at. % or more. In terms of the upper limit, the amount of the precipitated $Cu_3Sn$ compound is more preferably 2.4 at. % or less, even more preferably 1.9 at. % or less.

In the solder alloy according to the present invention, in terms of the lower limit, the amount of the precipitated SnSb compound is more preferably 17.2 at. % or more, even more preferably 37.5 at. % or more. In terms of the upper limit, the amount of the precipitated SnSb compound is more preferably 61.1 at. % or less, even more preferably 50.7 at. % or less.

In the solder alloy according to the present invention, in terms of the lower limit, the Sn phase content is more preferably 11.3% or more, even more preferably 22.7% or more. In terms of the upper limit, the Sn phase content is more preferably 56.7 at. % or less, even more preferably 38.2 at. % or less, particularly preferably 35.9% or less.

The alloy structure in the present invention may contain a compound different from the above four types to the extent that the effect of the solder alloy according to the present invention is not affected.

(9) Equations (1) to (3)

The alloy composition of the solder alloy according to the present invention preferably satisfies the following equations (1) to (3).

$$1.2 < Sn / \left\{ \left( \frac{26.84}{73.16} \right) \times Ag + \left( \frac{60.89}{39.11} \right) \times Cu \times x + \left( \frac{38.37}{61.63} \right) \times Cu \times (1-x) + \left( \frac{49.37}{50.63} \right) \times Sb \right\} \leq 6.50 \quad \text{equation (1)}$$

$$(2/3) \leq x \leq (15.3/16.3) \quad \text{equation (2)}$$

$$78 \leq Ag \times Cu \times Sb \leq 2029 \quad \text{equation (3)}$$

wherein Ag, Cu, and Sb each in the above equations (1) and (3) represents the content (mass %) in the alloy composition.

Equation (1) is a preferable aspect as a condition under which the Sn phase is precipitated after the Sn compounds described above are precipitated. Each of the coefficients in the middle side of equation (1) is obtained in order to keep the Sn remaining. First, the coefficient of Ag is described in detail.

Because the unit cell of the $Ag_3Sn$ compound is composed of 3 Ag and 1 Sn, the elemental ratio of the $Ag_3Sn$ compound is $Ag_{at.}:Sn_{at.}=3:1$. Because the atomic weight of Ag is 107.8682 and the atomic weight of Sn is 118.71, the mass ratio of the $Ag_3Sn$ compound is $Ag_{mass}:Sn_{mass}=107.8682 \times 3:118.71 \approx 73.16:26.84$. Therefore, the Sn amount required to precipitate the $Ag_3Sn$ compound is "(26.84/73.16)×Ag" when represented by the Ag content.

Next, the coefficient of Cu is described in detail. Because Cu precipitates the $Cu_6Sn_5$ and $Cu_3Sn$ compounds, it is necessary to determine the Sn content in order to precipitate each of them. Here, the amount of precipitated $Cu_6Sn_5$ and $Cu_3Sn$ compounds varies depending on the heating conditions during reflow, but it is considered that the amount of precipitated $Cu_6Sn_5$ compound is larger than that of the $Cu_3Sn$ compound in a general reflow step. The ratio of the amount of the precipitated compounds is approximately $Cu_6Sn_5:Cu_3Sn=8:2$, but it is easily assumed that this ratio varies. Therefore, as a preferred aspect of the present invention, to determine the range wherein the effect of the present invention is fully exerted, the coefficient of the $Cu_6Sn_5$ compound is multiplied by "x" in equation (2), and the coefficient of the $Cu_3Sn$ compound is multiplied by "1−x", in equation (1).

Namely, in equation (1), because the amount of the precipitated Cu-derived compound is taken into consideration in equation (2) in addition to the Sn content, the semiconductor chip and the substrate are crosslinked by the $Ag_3Sn$, $Cu_6Sn_5$, $Cu_3Sn$, and SnSb compounds, and the Sn phase is appropriately precipitated. Therefore, a high joint strength at high temperatures can be obtained, and damage to the semiconductor chip can be suppressed. In addition, by precisely controlling the alloy composition so that the Sn phase is appropriately precipitated, the melting point is slightly lowered, and voids can be suppressed.

Because the unit cell of the $Cu_6Sn_5$ compound is composed of 6 Cu and 5 Sn, the elemental ratio of the $Cu_6Sn_5$ compound is $Cu_{at.}:Sn_{at.}=6:5$. Because the atomic weight of Cu is 63.546 and the atomic weight of Sn is 118.71, the mass ratio of the $Cu_6Sn_5$ compound is $Cu_{mass}:Sn_{mass}=63.546 \times 6:118.71 \times 5 \approx 39.11:60.89$. Therefore, the Sn amount required to precipitate the $Cu_6Sn_5$ compound is "(60.89/39.11)×Cu" when represented by the Cu content.

Because the unit cell of the $Cu_3Sn$ compound is composed of 3 Cu and 1 Sn, the elemental ratio of the $Cu_3Sn$ compound is $Cu_{at.}:Sn_{at.}=3:1$. Because the atomic weight of Cu is 63.546 and the atomic weight of Sn is 118.71, the mass ratio of the $Cu_3Sn$ compound is $Cu_{mass}:Sn_{mass}=63.546 \times 3:118.71 \approx 61.63:38.37$. Therefore, the Sn amount required to precipitate the $Cu_3Sn$ compound is "(38.37/61.63)×Cu" when represented by the Cu content.

Similarly, because the unit cell of the SnSb compound is composed of 1 Sb and 1 Sn, the elemental ratio of the SnSb compound is $Sb_{at.}:Sn_{at.}=1:1$. Because the atomic weight of Sb is 121.76 and the atomic weight of Sn is 118.71, the mass ratio of the SnSb compound is $Sb_{mass}:Su_{mass}=121.76:118.71\approx 50.63:49.37$. Therefore, the Sn amount required to precipitate the SnSb compound is "(49.37/50.63)×Sb" when represented by the Sb content.

From the above, in a preferred aspect of the present invention, it was considered that the Sn phase would precipitate if the value obtained by dividing the Sn content by the total amount of these was 1.2 or more. In terms of the lower limit, the value of equation (1) is preferably 1.2 or more, more preferably 1.28 or more, even more preferably 1.29 or more, particularly preferably 1.66 or more, and most preferably 1.68 or more.

On the other hand, it is desirable that the semiconductor chip and the substrate are crosslinked with a series of Sn compounds by controlling the amount of the precipitated Sn phase to an appropriate amount, which likely to result in a higher joint strength at higher temperatures. From this point of view, in terms of the upper limit, the value of equation (1) is preferably 6.50 or less, more preferably 4.42 or less, further 4.25 or less, even more preferably 4.17 or less, and particularly preferably 2.38 or less, and most preferably 2.34 or less.

In the present invention, x in equation (2) can be obtained as follows. First, the cross section of the solder alloy is observed to determine the area ratio of $Cu_6Sn_5$ and $Cu_3Sn$. Assuming that the same area ratio can be obtained even if any cross section is observed, the obtained area ratio is regarded as the volume fraction. The mass ratio is calculated by multiplying the obtained volume fraction by the density of each compound, and the atomic ratio of each compound is converted from the mass ratio. The values of x and 1−x can be obtained from the ratio of the atomic ratios of each compound. When the ratio of the amount of precipitation is $Cu_6Sn_5:Cu_3Sn=8$(at. %):2(at. %), $x=8/(8+2)=0.8$, and $1-x=0.2$.

Then, based on the calculated result of equation (2), the middle side of equation (1) can be obtained.

Furthermore, it is preferable that the solder alloy according to the present invention contains Sb, Ag, and Cu, which easily precipitate Sn compounds, and that the Sn compounds and Sn phase as described above are precipitated. Therefore, in the alloy composition of the solder alloy according to the present invention, the contents of Sb, Ag, and Cu are within the above ranges, and equation (3) is preferably satisfied in addition to equations (1) and (2).

Equation (3) is the product of the Sb, Ag, and Cu contents. When these elements are added to a solder alloy in a well-balanced manner so as to satisfy equation (3), the amount of the precipitated specific Sn compound does not increase, and the coarsening of the specific Sn compound can be suppressed. Therefore, it is presumed that the joint strength at high temperatures can be improved. In terms of the lower limit, the value of equation (3) is preferably 78 or more, more preferably 360.0 or more, even more preferably 377.0 or more, particularly preferably 483.0 or more, and most preferably 800.0 or more. In terms of the upper limit, the value of equation (3) is preferably 2029 or less, more preferably 1357 or less, even more preferably 1320 or less, and particularly preferably 1080 or less.

(9) Balance: Sn

The balance of the solder alloy according to the present invention is Sn. In addition to the above-described elements, unavoidable impurities may be contained. Even if it contains unavoidable impurities, it does not affect the above-mentioned effects.

2. Solder Paste

The solder alloy according to the present invention can be used as a solder paste. The solder paste is obtained by mixing a solder alloy powder with a small amount of flux to form a paste. The solder alloy in the present invention may be utilized as a solder paste for mounting an electronic component on a printed circuit board using a reflow soldering method. The flux used for the solder paste may be either a water-soluble flux or a water-insoluble flux.

Furthermore, the flux used for the solder paste of the present invention is not particularly limited as long as it can be soldered by a common method. Therefore, a commonly used rosin, organic acid, activator, and solvent may be appropriately mixed and used. In the present invention, the blending ratio of the metal powder component and the flux component is not particularly limited, but the content of the solder alloy powder is preferably 5 to 15% based on the total mass of the solder paste.

3. Preform

The solder alloy according to the present invention can be used as a preform. Examples of the shape of the preform material include washers, rings, pellets, discs, ribbons, wires, balls and the like.

The preform solder may be used in reduced atmosphere joining without using flux. Because the reduced atmosphere joining does not contaminate the joined portion with flux, not only the cleaning of the joined portion in the post-joining process becomes unnecessary, but also the void of the solder joint can be reduced.

4. Solder Joint

The solder joint according to the present invention joins and connects a semiconductor chip in a semiconductor package with a ceramic substrate, printed circuit board, metal substrate, or the like. That is, the solder joint according to the present invention refers to the connection portion of the electrodes and can be formed by using general soldering conditions.

5. Other

Furthermore, the method for producing the solder alloy according to the present invention may be carried out according to a common method. The joining method using the solder alloy according to the present invention may be carried out according to a common method using, for example, a reflow furnace. When flow soldering is performed, the melting temperature of the solder alloy may be approximately 20° C. higher than the liquidus temperature. Furthermore, in the case of joining using the solder alloy according to the present invention, the precipitation of the Sn phase can be controlled by considering the cooling rate during solidification. For example, the solder joint is cooled at a cooling rate of 2 to 3° C./s or more. The other joining conditions may be appropriately adjusted in accordance with the alloy composition of the solder alloy.

The solder alloy according to the present invention can produce a low-α-ray alloy using a low α-ray material as its raw material. When such a low α-ray alloy is used to form solder bumps around a memory, soft errors can be suppressed.

EXAMPLES

A solder alloy comprising the alloy composition shown in Table 1 was prepared to produce a test substrate. The presence or absence of chip cracking after reflow was observed, the area ratio of voids was determined, and the shear strength at a high temperature was evaluated as the joint strength. Furthermore, for each alloy composition, the amount of precipitation of each compound was determined from the area ratio of each compound.

Evaluation of the Presence or Absence of Chip Cracking

The solder alloys listed in Table 1 were atomized to obtain the solder powder. A solder paste of each solder alloy was prepared by mixing with a soldering flux (manufactured by SENJU METAL INDUSTRY CO., LTD.: D128) composed of pine resin, solvent, activator, thixotropic agent, organic acid and the like. The content of the solder alloy powder in this solder paste was 90% based on the total mass of the solder paste. The solder paste was printed on a Cu substrate having a thickness of 3.0 mm with a metal mask having a thickness of 100 μm, followed by mounting 15 silicon chips with a mounter, and preparing a test substrate through reflow soldering under the conditions of a maximum temperature of 350° C. and a holding time of 60 seconds.

The 15 chips mounted on the test substrate were observed using an optical microscope at a magnification of 30 times, and it was visually confirmed whether the chips were cracked. The case where no crack was confirmed was regarded as "No," and the case where even one crack was confirmed was regarded as "Yes."

Void Area Ratio

As to the test substrate produced in "Evaluation of the presence or absence of chip cracking", the X-ray plane image with 30-fold magnification was displayed on a monitor using a TOSMICRON-6090FP manufactured by Toshiba FA System Engineering Co., Ltd., and voids were detected from the displayed image and the area ratio was calculated from the detected voids. The image analysis software used for the detection was Scandium, manufactured by Soft imaging system. Because the contrast between the voids and the other parts on the image is different, they can be identified using image analysis, and the measurement was performed by detecting only the voids. When the measured void area was less than 4.8% of the silicon chip area, the void was rated as "S", when it was 4.8% or more and 5% or less, the void was rated as "A", and when it exceeded 5%, the void was rated as Shear Strength at High Temperatures The shear strength of the solder joint was measured on 3 test substrates arbitrarily extracted from the test substrate prepared in "Evaluation of the presence or absence of chip cracking" at high temperatures (260° C.) using the joint strength tester STR-1000 manufactured by Resca, and the measured shear strength was regarded as the joint strength. The test conditions for the shear strength were a shear speed of 24 mm/min and a test height of 100 μm. Then, the shear strength was measured for each silicon chip, and the average was calculated. Those having an average value of 30 N or more were rated as "S," those having an average value of 20 N or more and less than 30 N were rated as "A," and those having an average value of less than 20 N were rated as "C."

Amounts of Precipitated Compounds

The solder alloy having the alloy composition shown in Table 1 was prepared, the prepared solder alloy was mirror-polished, and a cross-sectional image at 1000-fold magnification was taken using SEM. EDS analysis was carried out on this image, and the area of the compound was measured using image analysis software (Scandium) manufactured by Seika Sangyo Co., Ltd. The area ratio (%) of each compound was calculated by dividing the area of each compound by the area of the joint obtained from the SEM image. Assuming that the obtained area ratio was the volume fraction, the mass ratio was calculated by multiplying the volume fraction and the density of each compound and converted into an atomic ratio to obtain the amount (at. %) of precipitation of each compound.

Furthermore, in equation (1), regarding the ratio of the amount of precipitated $Cu_6Sn_5$ and $Cu_3Sn$, the ratio of the amount of the precipitation was obtained from the atomic ratio of both compounds, and "x" and "1−x" in the middle side of equation (2) were obtained. This result was applied to equation (1) to calculate the value of the middle side of equation (1) for each alloy composition.

The results are shown in Tables 1 and 2.

TABLE 1

| | Alloy composition (mass %, balance: Sn) | | | | | $Cu_6Sn_5$ Area (= Volume) | $Cu_3Sn$ Area (= Volume) | $Cu_6Sn_5$ Volume × Density = Mass | $Cu_3Sn$ Volume × Density = Mass | $Cu_6Sn_5$ Volume × Density = Mass (wt %) | $Cu_3Sn$ Volume × Density = Mass (wt %) |
|---|---|---|---|---|---|---|---|---|---|---|---|
| | Sn | Sb | Ag | Cu | others | | | | | | |
| Ex. 1 | bal. | 9 | 4.1 | 2.1 | | 763 | 98 | 6180.3 | 828.1 | 88.18 | 11.82 |
| Ex. 2 | bal. | 23 | 4.1 | 4 | | 1523 | 212 | 12336.3 | 1791.4 | 87.32 | 12.68 |
| Ex. 3 | bal. | 23 | 10 | 2.1 | | 691 | 102 | 5597.1 | 861.9 | 86.66 | 13.34 |
| Ex. 4 | bal. | 9 | 10 | 4 | | 1690 | 89 | 13689 | 752.05 | 94.79 | 5.21 |
| Ex. 5 | bal. | 20 | 10 | 4 | | 1516 | 221 | 12279.6 | 1867.45 | 86.80 | 13.20 |
| Ex. 6 | bal. | 27 | 10 | 4 | | 1453 | 190 | 11769.3 | 1605.5 | 88.00 | 12.00 |
| Ex. 7 | bal. | 23 | 10.9 | 4 | | 1489 | 117 | 12060.9 | 988.65 | 92.42 | 7.58 |
| Ex. 8 | bal. | 23 | 10 | 5.9 | | 1756 | 255 | 14223.6 | 2154.75 | 86.84 | 13.16 |
| Ex. 9 | bal. | 33 | 10 | 4 | | 1567 | 198 | 12692.7 | 1673.1 | 88.35 | 11.65 |
| Ex. 10 | bal. | 33 | 10.9 | 5.9 | | 1821 | 234 | 14750.1 | 1977.3 | 88.18 | 11.82 |
| Ex. 11 | bal. | 20 | 10 | 4 | Al:0.03 | 1467 | 92 | 11882.7 | 777.4 | 93.86 | 6.14 |
| Ex. 12 | bal. | 20 | 10 | 4 | Fe:0.046 | 1522 | 103 | 12328.2 | 870.35 | 93.41 | 6.59 |
| Ex. 13 | bal. | 20 | 10 | 4 | Ti:0.04 | 1577 | 96 | 12773.7 | 811.2 | 94.03 | 5.97 |
| Ex. 14 | bal. | 20 | 10 | 4 | P:0.003 | 1465 | 127 | 11866.5 | 1073.15 | 91.71 | 8.29 |
| Ex. 15 | bal. | 20 | 10 | 4 | Ge:0.005 | 1392 | 165 | 11275.2 | 1394.25 | 89.00 | 11.00 |
| Ex. 16 | bal. | 20 | 10 | 4 | Ga:0.005 | 1428 | 179 | 11566.8 | 1512.55 | 88.44 | 11.56 |
| Ex. 17 | bal. | 20 | 10 | 4 | Ni:0.03 | 1378 | 89 | 11161.8 | 752.05 | 93.69 | 6.31 |
| Ex. 18 | bal. | 20 | 10 | 4 | Co:0.04 | 1476 | 101 | 11955.6 | 853.45 | 93.34 | 6.66 |
| Ex. 19 | bal. | 20 | 10 | 4 | Mn:0.02 | 1542 | 134 | 12490.2 | 1132.3 | 91.69 | 8.31 |
| Ex. 20 | bal. | 20 | 10 | 4 | Au:0.02 | 1590 | 157 | 12879 | 1326.65 | 90.66 | 9.34 |
| Ex. 21 | bal. | 20 | 10 | 4 | Ce:0.049 | 1554 | 161 | 12587.4 | 1360.45 | 90.25 | 9.75 |
| Ex. 22 | bal. | 20 | 10 | 4 | In:0.9 | 1442 | 125 | 11680.2 | 1056.25 | 91.71 | 8.29 |
| Ex. 23 | bal. | 20 | 10 | 4 | Mo:0.0025 | 1560 | 148 | 12636 | 1250.6 | 90.99 | 9.01 |

TABLE 1-continued

| | | | | | | | | | | |
|---|---|---|---|---|---|---|---|---|---|---|
| Ex. 24 | bal. | 20 | 10 | 4 | Nb:0.003 | 1572 | 166 | 12733.2 | 1402.7 | 90.08 | 9.92 |
| Ex. 25 | bal. | 20 | 10 | 4 | Pd:0.015 | 1598 | 186 | 12943.8 | 1571.7 | 89.17 | 10.83 |
| Ex. 26 | bal. | 20 | 10 | 4 | Pt:0.0096 | 1538 | 178 | 12457.8 | 1504.1 | 89.23 | 10.77 |
| Ex. 27 | bal. | 20 | 10 | 4 | V:0.005 | 1582 | 192 | 12814.2 | 1622.4 | 88.76 | 11.24 |
| Ex. 28 | bal. | 20 | 10 | 4 | Ca:0.1 | 1566 | 170 | 12684.6 | 1436.5 | 89.83 | 10.17 |
| Ex. 29 | bal. | 20 | 10 | 4 | Mg:0.0045 | 1589 | 199 | 12870.9 | 1681.55 | 88.44 | 11.56 |

Table 1 continued

| | $Cu_6Sn_5$ Atomic Weight (at. %) | $Cu_3Sn$ Atomic Weight (at. %) | Middle side of Equation (2) x | 1 − x | Middle side of Equation (1) | Middle side of Equation (3) | Chip Cracking | Void Area Ratio | Shear Strength at High Temperature |
|---|---|---|---|---|---|---|---|---|---|
| Ex. 1 | 70.31 | 29.69 | 0.7031 | 0.2969 | 6.54 | 77 | No | S | A |
| Ex. 2 | 68.61 | 31.39 | 0.6861 | 0.3139 | 2.38 | 377 | No | S | S |
| Ex. 3 | 67.33 | 32.67 | 0.6733 | 0.3267 | 2.26 | 483 | No | S | S |
| Ex. 4 | 85.24 | 14.76 | 0.8524 | 0.1476 | 4.25 | 360 | No | S | S |
| Ex. 5 | 67.60 | 32.40 | 0.6760 | 0.3240 | 2.34 | 800 | No | S | S |
| Ex. 6 | 69.94 | 30.06 | 0.6994 | 0.3006 | 1.68 | 1080 | No | S | S |
| Ex. 7 | 79.47 | 20.53 | 0.7947 | 0.2053 | 1.95 | 1003 | No | S | S |
| Ex. 8 | 67.69 | 32.31 | 0.6769 | 0.3231 | 1.82 | 1357 | No | S | S |
| Ex. 9 | 70.65 | 29.35 | 0.7065 | 0.2935 | 1.29 | 1320 | No | S | S |
| Ex. 10 | 70.30 | 29.70 | 0.7030 | 0.2970 | 1.15 | 2122 | No | A | S |
| Ex. 11 | 82.91 | 17.09 | 0.8291 | 0.1709 | 2.29 | 800 | No | S | S |
| Ex. 12 | 81.80 | 18.20 | 0.8180 | 0.1820 | 2.30 | 800 | No | S | S |
| Ex. 13 | 83.33 | 16.67 | 0.8333 | 0.1667 | 2.29 | 800 | No | S | S |
| Ex. 14 | 77.82 | 22.18 | 0.7782 | 0.2218 | 2.31 | 800 | No | S | S |
| Ex. 15 | 71.96 | 28.04 | 0.7196 | 0.2804 | 2.33 | 800 | No | S | S |
| Ex. 16 | 70.82 | 29.18 | 0.7082 | 0.2918 | 2.33 | 800 | No | S | S |
| Ex. 17 | 82.49 | 17.51 | 0.8249 | 0.1751 | 2.30 | 800 | No | S | S |
| Ex. 18 | 81.64 | 18.36 | 0.8164 | 0.1836 | 2.30 | 800 | No | S | S |
| Ex. 19 | 77.78 | 22.22 | 0.7778 | 0.2222 | 2.31 | 800 | No | S | S |
| Ex. 20 | 75.49 | 24.51 | 0.7549 | 0.2451 | 2.32 | 800 | No | S | S |
| Ex. 21 | 74.59 | 25.41 | 0.7459 | 0.2541 | 2.32 | 800 | No | S | S |
| Ex. 22 | 77.82 | 22.18 | 0.7782 | 0.2218 | 2.31 | 800 | No | S | S |
| Ex. 23 | 76.23 | 23.77 | 0.7623 | 0.2377 | 2.31 | 800 | No | S | S |
| Ex. 24 | 74.23 | 25.77 | 0.7423 | 0.2577 | 2.32 | 800 | No | S | S |
| Ex. 25 | 72.33 | 27.67 | 0.7233 | 0.2767 | 2.33 | 800 | No | S | S |
| Ex. 26 | 72.44 | 27.56 | 0.7244 | 0.2756 | 2.33 | 800 | No | S | S |
| Ex. 27 | 71.48 | 28.52 | 0.7148 | 0.2852 | 2.33 | 800 | No | S | S |
| Ex. 28 | 73.70 | 26.30 | 0.7370 | 0.2630 | 2.32 | 800 | No | S | S |
| Ex. 29 | 70.84 | 29.16 | 0.7084 | 0.2916 | 2.33 | 800 | No | S | S |

TABLE 2

| | Alloy composition (mass %, balance: Sn) | | | | | Cu₆Sn₅ Area (=Volume) | Cu₃Sn Area (=Volume) | Cu₆Sn₅ Volume × Density = Mass | Cu₃Sn Volume × Density = Mass | Cu₆Sn₅ Volume × Density = Mass (wt %) | Cu₃Sn Volume × Density = Mass (wt %) |
|---|---|---|---|---|---|---|---|---|---|---|---|
| | Sn | Sb | Ag | Cu | Others | | | | | | |
| Ex. 30 | bal. | 20 | 10 | 4 | Si:0.0008 | 1521 | 162 | 12320.1 | 1368.9 | 90.00 | 10.00 |
| Ex. 31 | bal. | 20 | 10 | 4 | Zn:0.2 | 1545 | 158 | 12514.5 | 1335.1 | 90.36 | 9.64 |
| Ex. 32 | bal. | 20 | 10 | 4 | Bi:0.3 | 1488 | 143 | 12052.8 | 1208.35 | 90.89 | 9.11 |
| Ex. 33 | bal. | 20 | 10 | 4 | Zr:0.0008 | 1571 | 168 | 12725.1 | 1419.6 | 89.96 | 10.04 |
| Ex. 34 | bal. | 20 | 10 | 4 | Al:0.03, Fe:0.046, Ti:0.04, P:0.003, Ge:0.005, Ga:0.005, Ni:0.03, Co:0.04, Mn:0.02, Au:0.02, Ce:0.049, In:0.9, Mo:0.0025, Nb:0.003, Pd:0.015, Pt:0.0096, V:0.005, Ca:0.1, Mg:0.0045, Si:0.0008, Zn:0.2, Bi:0.3, Zr:0.0008 | 1360 | 92 | 11016 | 777.4 | 93.41 | 6.59 |
| Comp. Ex. 1 | bal. | 8 | 3 | 1 | | 284 | 23 | 2300.4 | 194.35 | 92.21 | 7.79 |
| Comp. Ex. 2 | bal. | 8 | 10 | 4 | | 1533 | 139 | 12417.3 | 1174.55 | 91.36 | 8.64 |
| Comp. Ex. 3 | bal. | 55 | 10 | 4 | | 1323 | 88 | 10716.3 | 743.6 | 93.51 | 6.49 |
| Comp. Ex. 4 | bal. | 20 | 3 | 4 | | 1580 | 157 | 12798 | 1326.65 | 90.61 | 9.39 |
| Comp. Ex. 5 | bal. | 20 | 12 | 4 | | 1522 | 132 | 12328.2 | 1115.4 | 91.70 | 8.30 |
| Comp. Ex. 6 | bal. | 20 | 10 | 1 | | 303 | 18 | 2454.3 | 152.1 | 94.16 | 5.84 |
| Comp. Ex. 7 | bal. | 20 | 10 | 7 | | 1926 | 298 | 15600.6 | 2518.1 | 86.10 | 13.90 |
| Comp. Ex. 8 | bal. | 35 | 12 | 7 | | 1806 | 242 | 14628.6 | 2044.9 | 87.74 | 12.26 |

TABLE 2-continued

Table 2 continued

| | Cu$_6$Sn$_5$ Atomic Weight (at. %) | Cu$_3$Sn Atomic Weight (at. %) | Middle side of Equation (2) x | 1 − x | Middle side of Equation (1) | Middle side of Equation (3) | Chip Cracking | Void Area Ratio | Shear Strength at High Temperature |
|---|---|---|---|---|---|---|---|---|---|
| Ex. 30 | 74.07 | 25.93 | 0.7407 | 0.2593 | 2.32 | 800 | No | S | S |
| Ex. 31 | 74.84 | 25.16 | 0.7484 | 0.2516 | 2.32 | 800 | No | S | S |
| Ex. 32 | 75.99 | 24.01 | 0.7599 | 0.2401 | 2.32 | 800 | No | S | S |
| Ex. 33 | 73.99 | 26.01 | 0.7399 | 0.2601 | 2.32 | 800 | No | S | S |
| Ex. 34 | 81.81 | 18.19 | 0.8181 | 0.1819 | 2.30 | 800 | No | S | S |
| Comp. Ex. 1 | 78.98 | 21.02 | 0.7898 | 0.2102 | 8.58 | 24 | No | S | C |
| Comp. Ex. 2 | 77.04 | 22.96 | 0.7704 | 0.2296 | 4.63 | 320 | No | S | C |
| Comp. Ex. 3 | 82.06 | 17.94 | 0.8206 | 0.1794 | 1.18 | 1400 | Yes | C | — |
| Comp. Ex. 4 | 75.38 | 24.62 | 0.7538 | 0.2462 | 2.82 | 240 | No | S | C |
| Comp. Ex. 5 | 77.82 | 22.18 | 0.7782 | 0.2218 | 2.18 | 960 | Yes | A | — |
| Comp. Ex. 6 | 83.66 | 16.34 | 0.8366 | 0.1634 | 2.81 | 200 | No | S | C |
| Comp. Ex. 7 | 66.29 | 33.71 | 0.6629 | 0.3371 | 1.98 | 1400 | Yes | C | — |
| Comp. Ex. 8 | 69.42 | 30.58 | 0.6942 | 0.3058 | 0.97 | 2940 | Yes | C | — |

*The underlined number indicates that it is outside the range of the present invention.

As is clear from Tables 1 and 2, it was found in each of Examples of the present invention, that chip cracking did not occur, the area ratio of voids was low, the heat dissipation characteristics were excellent, and the shear strength at high temperatures was high. It was also confirmed that, except for Examples 1 and 10 of the present invention, all of $Ag_3Sn$, $Cu_6Sn_5$, $Cu_3Sn$, and SnSb, and Sn phases were present, and the amount of each precipitated was within the above-mentioned preferable range. Therefore, because Examples 2 to 9 and Examples 11 to 34 of the present invention all satisfy equations (1) to (3), it was found that an appropriate precipitation of the Sn phase further exerts the above effect.

Meanwhile, in Comparative Example 1, because the Sb, Ag, and Cu contents were all small, the shear strength at high temperatures was inferior. In Comparative Example 2, because the Sb content was low, the shear strength at high temperatures was inferior. In Comparative Example 3, because the Sb content was high, chip cracking occurred. Therefore, it was not possible to measure the shear strength at high temperatures.

In Comparative Example 4, because the Ag content was low, the shear strength at high temperatures was inferior. In Comparative Example 5, because the Ag content was high, chip cracking occurred. Therefore, it was not possible to measure the shear strength at high temperatures. In Comparative Example 6, because the Cu content was low, the shear strength at high temperatures was inferior. In Comparative Example 7, because the Cu content was high, chip cracking occurred, and many voids also occurred. Therefore, it was not possible to measure the shear strength at high temperatures. In Comparative Example 8, the Sb, Ag, and Cu contents were all high, chip cracking occurred, and many voids also occurred. Therefore, it was not possible to measure the shear strength at high temperatures.

Next, the structure of the solder alloy is described using a cross-sectional image of the solder joint. FIG. 1 shows a cross-sectional SEM image and a cross-sectional EDS element mapping diagram of a solder joint. FIG. 1A shows an SEM image of Comparative Example 2. FIG. 1B shows a cross-sectional EDS element mapping diagram of Comparative Example 2. FIG. 1C shows an SEM image of Example 6 of the present invention. FIG. 1D shows a cross-sectional EDS element mapping diagram of Example 6 of the present invention.

As shown in FIG. 1, it was found that SnSb, $Cu_6Sn_5$, $Cu_3Sn$, and $Ag_3Sn$ were formed in this example. As shown in FIG. 1D, it was found that the solder joint of Example 6 of the present invention had an excellent balance between $Cu_6Sn_5$ and $Cu_3Sn$. Furthermore, as shown in FIG. 1D, in Example 6 of the present invention, because the Sn phase was separated by the compound, it was found that the test substrate and the silicon chip were crosslinked by the compound. Therefore, it was found that Example 6 of the present invention exhibits excellent shear strength at high temperatures. Meanwhile, as shown in FIG. 1B, in Comparative Example 2, it was found that the Sn phase on the left side of the image was continuous from the vicinity of the test substrate to the vicinity of the silicon chip, and this portion was not crosslinked by the compound. Therefore, it was found that in Comparative Example 2, the shear strength at high temperatures was inferior.

Figure 2:
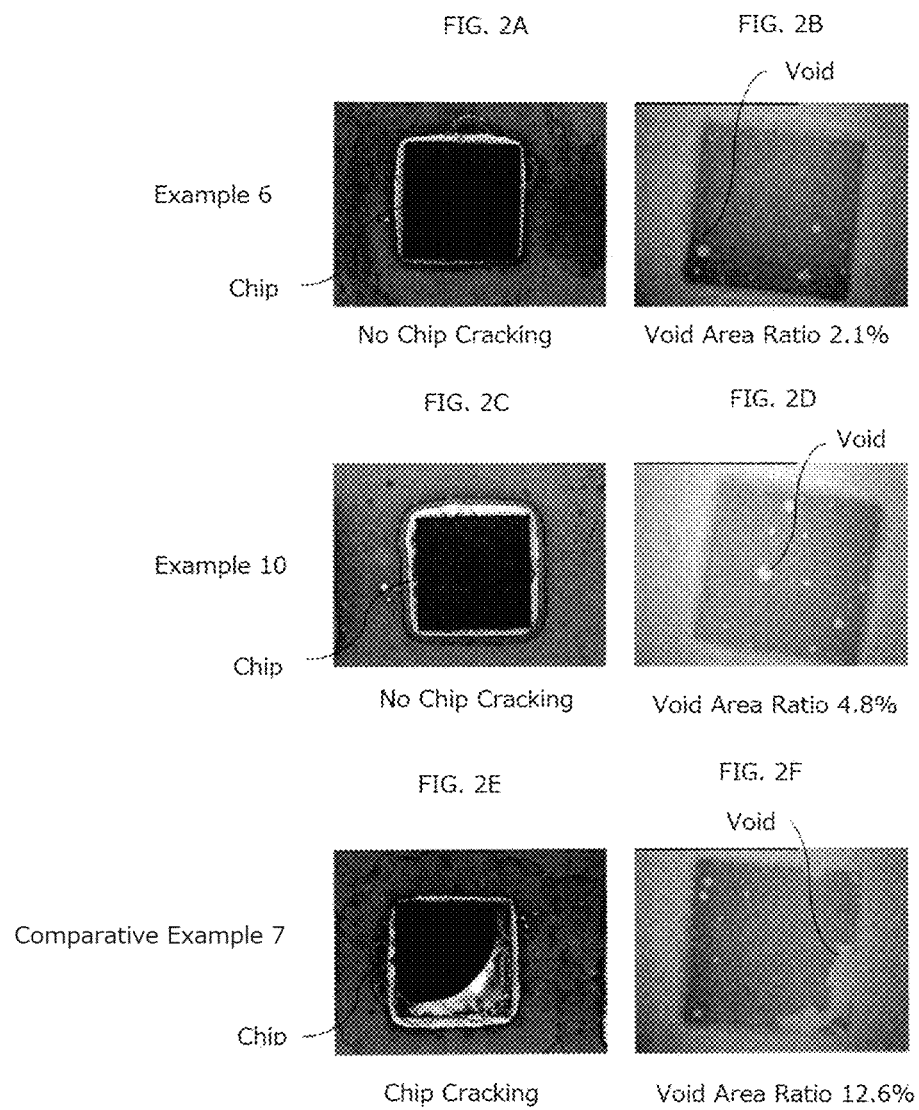
FIG. 2 shows an optical micrograph and an X-ray plane image of the chip after soldering.

FIG. 2 shows an optical micrograph and an X-ray plane image of the chip after soldering. FIG. 2A shows an optical micrograph of Example 6 of the present invention. FIG. 2B shows an X-ray plan image of Example 6 of the present invention. FIG. 2C shows an optical micrograph of Example 10 of the present invention. FIG. 2D shows an X-ray plan image of Example 10 of the present invention. FIG. 2E shows an optical micrograph of Comparative Example 7. FIG. 2F shows an X-ray plan photograph of Comparative Example 7. In Examples 6 and 10 of the present invention, it was found that chip cracking did not occur and the void area ratio was 5% or less. It was found that Example 6 of the present invention had a void area ratio that was even lower than that of Example 10 of the present invention. On the other hand, in Comparative Example 7, it was found that chip cracking occurred, and the void area ratio far exceeded 5%.

Figure 3:
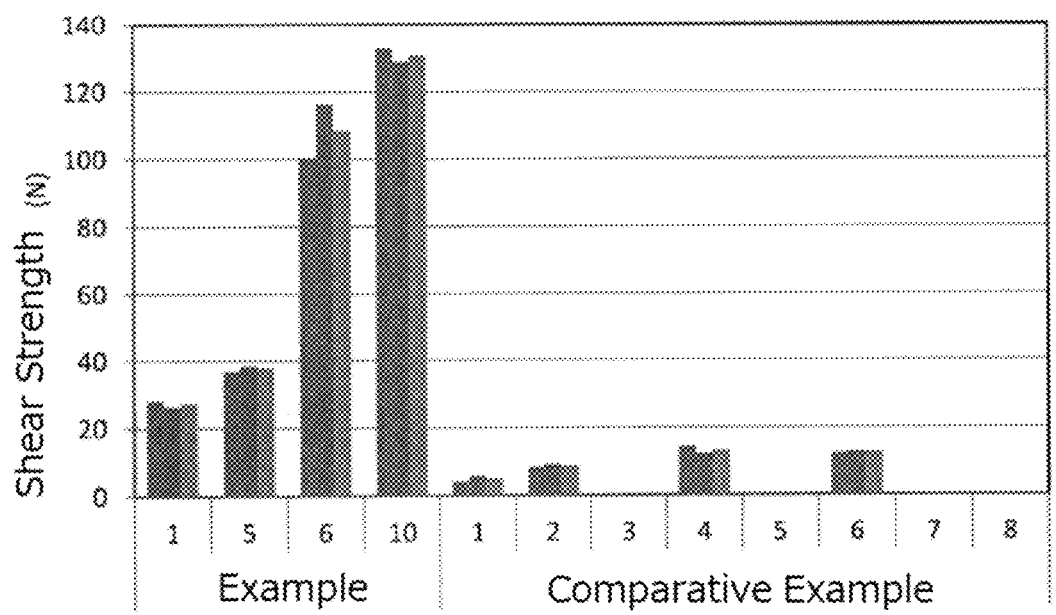
FIG. 3 is a graph showing the shear strengths of Examples 1, 5, 6, and 10 of the present invention and Comparative Examples 1 to 8.

FIG. 3 is a graph showing the shear strengths of Examples 1, 5, 6, and 10 of the present invention and Comparative Examples 1 to 8. In FIG. 4, in Comparative Examples 3, 5, 7, and 8, chip cracking occurred and the shear strength at high temperatures could not be measured, so the fields were left blank. As is clear from FIG. 3, it was found that all of Examples of the present invention showed higher shear strength at high temperatures than Comparative Examples. Furthermore, it was found that Examples 5, 6, and 10 of the present invention all exhibited higher shear strength at high temperature than Example 1 of the present invention.

The invention claimed is:

1. A solder alloy consisting of Ag, Cu, and Sb, the balance being Sn, wherein the solder alloy has an alloy structure comprising at least one of: an $Ag_3Sn$ compound, a $Cu_3Sn$ compound, a $Cu_6Sn_5$ compound, and a SnSb compound, and the balance being a Sn phase,
wherein said alloy structure includes by at % the $Ag_3Sn$ compound: 13.9 to 15.4%, the $Cu_6Sn_5$ compound: 5.6 to 15.3%, the $Cu_3Sn$ compound: 1.0 to 2.8%, and the SnSb compound: 16.8 to 62.1%.

2. The solder alloy according to claim 1, wherein said alloy structure includes the Sn phase in an amount of 5.6 to 70.2% by at %.

3. A solder alloy having an alloy composition consisting of, by mass:
Sb: 9.0 to 33.0%;
Ag: more than 4.0% and less than 11.0%;
Cu: more than 2.0% and less than 6.0%; and
the balance being Sn,
wherein said solder alloy has an alloy structure comprising at least one of: an $Ag_3Sn$ compound, a $Cu_3Sn$ compound, a $Cu_6Sn_5$ compound, and a SnSb compound, and the balance being a Sn phase, and
wherein in said alloy structure, an amount of the $Ag_3Sn$ compound is 13.9 to 15.4 at. %, an amount of the $Cu_3Sn$ compound is 1.0 to 2.8 at. %, an amount of the $Cu_6Sn_5$ compound is 5.6 to 15.3 at. %, and an amount of the SnSb compound is 16.8 to 62.1 at. %.

4. The solder alloy according to claim 3, wherein said alloy structure includes the Sn phase in an amount of 5.6 to 70.2% by at %.

5. The solder alloy according to claim 3, wherein said alloy composition satisfies the following equations (1) to (3):

$$1.2 < Sn/\left\{\left(\frac{26.84}{73.16}\right) \times Ag + \left(\frac{60.89}{39.11}\right) \times Cu \times x + \left(\frac{38.37}{61.63}\right) \times Cu \times (1-x) + \left(\frac{49.37}{50.63}\right) \times Sb\right\} \leq 6.50 \quad \text{equation (1)}$$

$$(2/3) \leq x \leq (15.3/16.3) \quad \text{equation (2)}$$

$$78 \leq Ag \times Cu \times Sb \leq 2029 \quad \text{equation (3)}$$

wherein Ag, Cu, and Sb each in the above equations (1) to (3) represent the content (mass %) in said alloy composition.

6. A solder paste comprising the solder alloy according claim 3.

7. A solder preform comprising the solder alloy according to claim 3.

8. A solder joint comprising the solder alloy according claim 3.

* * * * *